(12) United States Patent
Blatt

(10) Patent No.: US 10,869,572 B2
(45) Date of Patent: Dec. 22, 2020

(54) AUTOMATIC BEVERAGE MACHINE

(71) Applicant: Nicolas Blatt, Valinhos (BR)

(72) Inventor: Nicolas Blatt, Valinhos (BR)

(73) Assignee: CUBO BEVERAGES LLC, Irvine, CA (US)

( * ) Notice: Subject to any disclaimer, the term of this patent is extended or adjusted under 35 U.S.C. 154(b) by 57 days.

(21) Appl. No.: 15/407,682

(22) Filed: Jan. 17, 2017

(65) Prior Publication Data

US 2018/0199754 A1   Jul. 19, 2018

(51) Int. Cl.
*A47J 31/44* (2006.01)
*A47J 31/40* (2006.01)
*A47J 43/042* (2006.01)

(52) U.S. Cl.
CPC ......... *A47J 31/4492* (2013.01); *A47J 31/407* (2013.01); *A47J 31/4403* (2013.01); *A47J 43/042* (2013.01)

(58) Field of Classification Search
CPC .. A47J 31/4492; A47J 31/407; A47J 31/4403; A47J 43/042; A47J 31/40; A47J 31/44; A47J 31/4407; A47J 31/4489; A47J 31/461; A47J 31/462; B65B 69/005
USPC ....... 99/295, 297, 302 P; 426/115, 393, 394, 426/232; 222/23, 146.1–146.5, 196, 226, 222/325
See application file for complete search history.

(56) References Cited

U.S. PATENT DOCUMENTS

| | | | |
|---|---|---|---|
| 2009/0007792 A1* | 1/2009 | Glucksman | A47J 31/4407 99/282 |
| 2010/0139493 A1* | 6/2010 | Nevarez | B67D 1/0021 99/275 |
| 2010/0154645 A1* | 6/2010 | Nosler | A47J 31/007 99/281 |
| 2013/0068795 A1* | 3/2013 | Kim | B67D 3/0025 222/226 |
| 2014/0116262 A1* | 5/2014 | Cheung | A47J 43/07 99/348 |
| 2014/0302204 A1* | 10/2014 | Evers | B65B 69/005 426/115 |
| 2015/0071025 A1* | 3/2015 | Herbert | A23G 9/12 366/150.1 |
| 2015/0135962 A1* | 5/2015 | Jarisch | A47J 31/4492 99/280 |
| 2016/0023879 A1 | 1/2016 | Walker | |

(Continued)

OTHER PUBLICATIONS

Jenny Mcgrath; Stick A Prepacked, Produce-Filled Pod in the Nutralux and Get Juice in 30 Seconds; Digital Trends; Feb. 4, 2016; http://www.digitaltrends.com/home/the-nutralux-is-a-pod-based-cold-press-juicer-for-the-home/.

(Continued)

*Primary Examiner* — Justin C Dodson
(74) *Attorney, Agent, or Firm* — Lynch LLP; Sean Lynch

(57) ABSTRACT

Systems, methods, and apparatuses of a beverage making system. A beverage making system that uses frozen or partially frozen pods to create a serving of a beverage. The system can include multiple reservoirs along with one or more pumps, a blending element, a heater, and various sensors to create a beverage. A method of creating a beverage describes the different steps that the system goes through in creating a beverage, from receiving and compressing a beverage pod, to mixing and dispensing a beverage.

6 Claims, 5 Drawing Sheets

(56) References Cited

U.S. PATENT DOCUMENTS

2016/0184830 A1\* 6/2016 Misumi .................. A47J 42/16
99/286
2016/0242594 A1\* 8/2016 Empl .................. A47J 31/3623

OTHER PUBLICATIONS

David Gelles; A $700 Juicer for the Kitchen That Caught Silicon Valley's Eye; New York Times; Mar. 31, 2016; http://www.nytimes.com/2016/04/03/business/juicero-juice-system-silicon-valley-interest.html?_r=0.
Brian Bennett; Juicero home juicing system is built to squeeze your wallet dry; CNET; Mar. 31, 2016; https:// www.cnet.com/products/juicero/preview/.

\* cited by examiner

AUTOMATIC BEVERAGE MACHINE

FIELD OF THE INVENTION

The field of the invention is beverage machines.

BACKGROUND

The background description includes information that may be useful in understanding the present invention. It is not an admission that any of the information provided in this application is prior art or relevant to the presently claimed invention, or that any publication specifically or implicitly referenced is prior art.

Others have attempted to create Beverage making systems, but have failed to appreciate certain inventive concepts. For example, the Juicero Press takes recyclable pods that have a variety of pre-packaged fruits and vegetables and turns it into a fresh juice. A pod is placed in the machine, and juice comes out one serving at a time. But the Juicero Press fails to appreciate that a blending element can increase the versatility of the machine. The Juicero Press also fails to consider that pods can contain information that instructs the machine how to calibrate its subsystems to create each particular juice.

The Nutralux is another beverage-making device existing within the market. But this device fails to contemplate the advantages of a pod-based system. Instead, the Nutralux is a blender that makes one serving of juice at a time by blending fruits, vegetables, etc. that are placed within the blending compartment of the device.

Finally, U.S. patent application Ser. No. 2016/0023879A1 describes a device that is used to make mixed drinks using single serving beverage containers. But this application fails to contemplate the different mechanisms needed to extract the contents of a frozen pod.

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

It has yet to be appreciated that a beverage making system can use frozen beverage pods to quickly create one or more servings of a beverage. Thus, there is still the need for an improved pod-based beverage making system.

SUMMARY OF THE INVENTION

The present invention provides apparatus, systems, and methods in which a machine is used to make beverage. In one aspect of the inventive subject matter, a beverage making system that uses a beverage pod (e.g., a pod containing frozen beverage or frozen beverage from concentrate) to create beverage is contemplated. The beverage making system includes a water reservoir that is coupled to a beverage reservoir (e.g., either directly or indirectly via tubing). The system includes a pod receiving compartment that is also coupled to the beverage reservoir, where the pod receiving compartment is further coupled with a compression mechanism (e.g., a piston). The compression mechanism can be electronically actuated, pneumatically actuated, or manually actuated.

The pod receiving compartment takes in a beverage pod and then the compression mechanism is configured to compress the beverage pod. When the compression mechanism compresses the beverage pod within the pod receiving compartment, the beverage pod's contents are emptied into the beverage reservoir. The beverage reservoir includes a rotatable blade (e.g., a blender-like blade), where the rotatable blade is activated to mix water from the water reservoir with the contents of the beverage pod to create the beverage. The rotatable blade is actuated by an electromechanical device (e.g., an electronic motor).

In some embodiments, the system additionally includes an electronic beverage pod-reader, which enables dynamic system adjustment based on a requirement introduced by the beverage pod. The electronic beverage pod-reader collects information regarding the beverage pod in the pod receiving compartment.

In another aspect of the inventive subject matter, a method of making beverage from a beverage pod is contemplated. The method steps include: (1) receiving a beverage pod in a pod receiving compartment; (2) using a compression mechanism (e.g., a piston) to compress the beverage pod to empty the beverage pod's contents into a beverage reservoir; (3) moving water from a water reservoir to the beverage reservoir; (4) activating a rotatable blade to mix the contents of the beverage pod with the water to create the beverage; and (5) dispensing the beverage.

In some embodiments, the method also includes the step of electronically detecting information regarding the beverage pod (e.g., using an RFID reader). The beverage pod can have information such as a recommended water temperature, recommended water volume, and a set of parameters related to operation of the rotating blade (e.g., rotation speed, rotation pattern, etc.).

Some embodiments of the method also include the step of self-cleaning by spraying water from the water reservoir into the beverage reservoir after dispensing the beverage. The water sprayed into the beverage reservoir can rinse off its interior walls.

In some embodiments, the method additionally includes the step of heating the beverage reservoir to melt the contents of the beverage pod. This step can alternatively, or additionally, require bringing the temperature of the contents of the beverage pod and the water in the beverage reservoir up to a desired temperature.

Various objects, features, aspects and advantages of the inventive subject matter will become more apparent from the following detailed description of preferred embodiments, along with the accompanying drawing figures in which like numerals represent like components.

DETAILED DESCRIPTION

Figure 2:
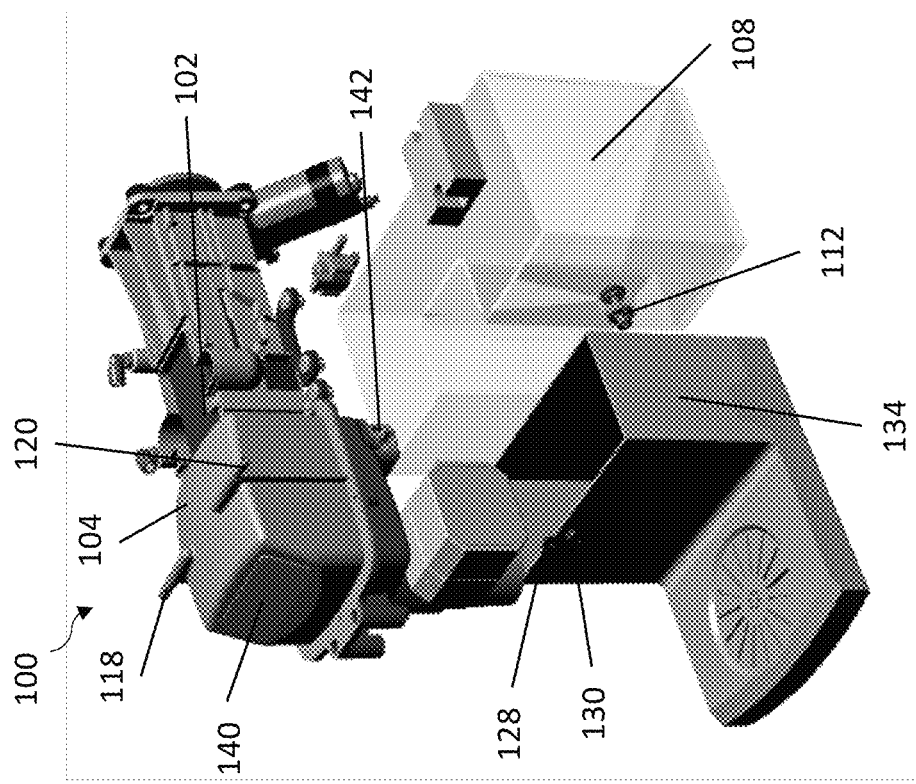
FIG. 2 is the beverage making system of FIG. 1 without the exterior casing.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

Figure 1:
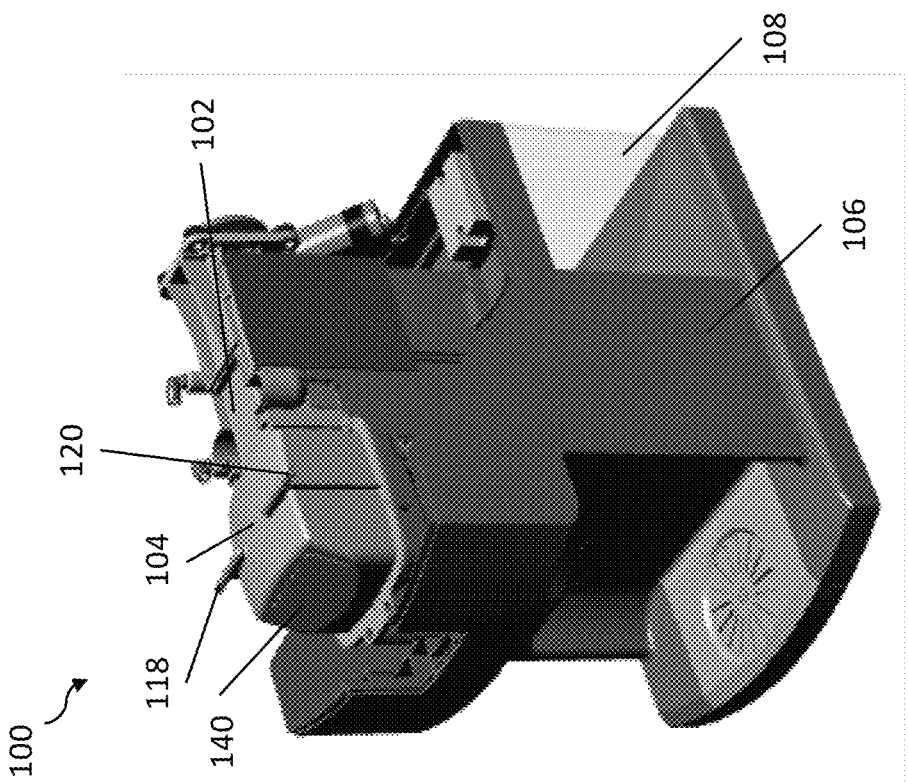
FIG. 1 is a perspective view of a beverage making system of the inventive subject matter.
Figure 9:
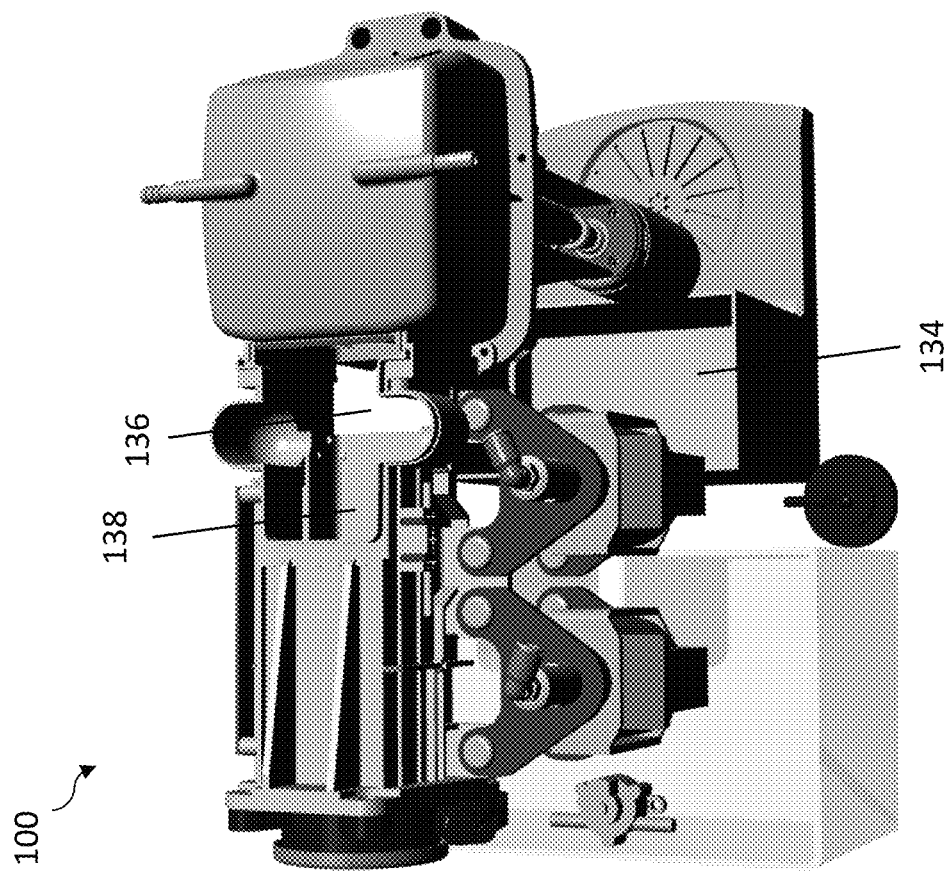
FIG. 9 is the beverage making system as seen in FIG. 2 and showing the beverage pod compartment.

FIG. 1 shows a beverage making system 100 of the inventive subject matter. Beverage making systems of the inventive subject matter are designed to quickly produce a beverage (e.g., one or more servings) using beverage pods. Beverage pods, which contain frozen beverage or frozen beverage from concentrate, can be purchased and stored in a freezer. A lid (not shown) on a beverage pod compartment 138 is moved (e.g., opened) so that the beverage pod can be inserted into a beverage pod compartment 138. The beverage pod compartment 138 is depicted as the space that is occupied by mechanism 102 in FIGS. 1-7 and 9. When mechanism 102 is retracted the resulting vacancy is the beverage pod compartment 138, which is best seen in FIG. 9.

Figure 4:
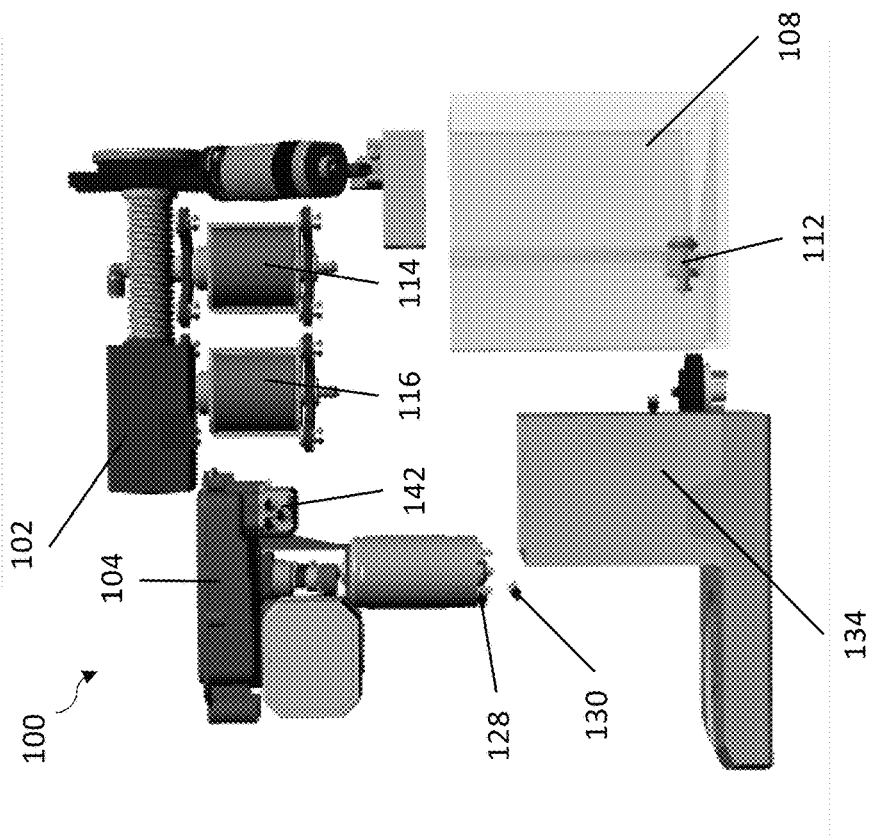
FIG. 4 is a side view of the beverage making system of FIG. 1 showing more internal components.
Figure 6:
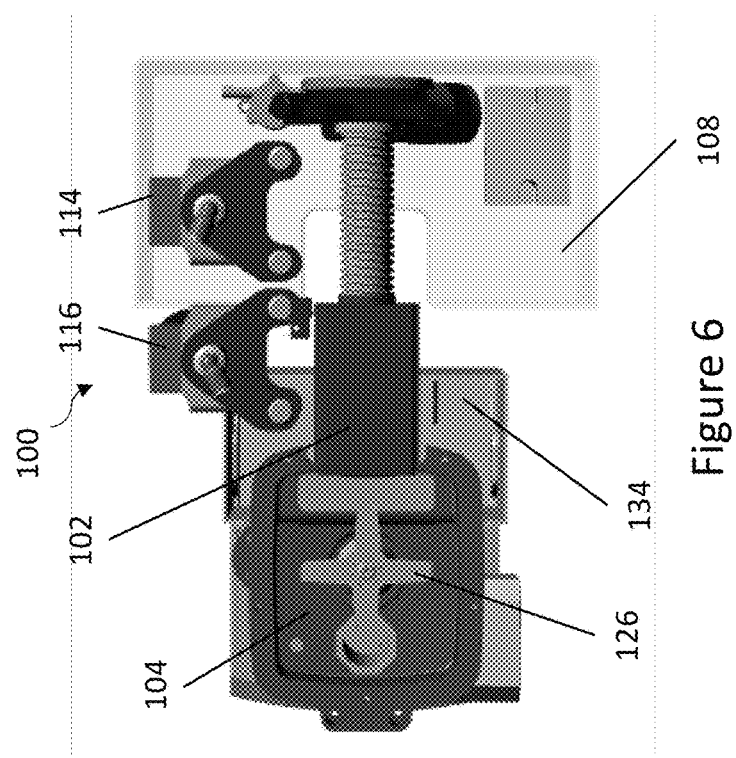
FIG. 6 is a top view of the beverage making system as seen in FIG. 4.

Once a beverage pod is inserted into the machine 100 (e.g., into the beverage pod compartment 138), a mechanism 102 is activated that compresses the beverage pod, squeezing its contents into a beverage reservoir 104 (depicted with the cover on in FIGS. 1-3, 5, and 7 and with the cover off in FIGS. 4 and 6). Water is then added to the frozen (or partly frozen) contents of the beverage pod before activating a blending system. After the mixture is blended, the resulting beverage drink is dispensed from the system 100. Many of the components discussed above, but not shown in FIG. 1, will be discussed in the paragraphs that follow in association with the corresponding figures.

In some embodiments, more than one beverage pod can be used to make a beverage. For example, two beverage pods can be inserted into the beverage pod compartment 138 at the same time (e.g., half-sized beverage pods) so that a user can mix and match flavors to create a juice blend. In another example, a user can create a serving (e.g., a double, single, or other quantity serving) of juice by inserting a first beverage pod followed by a second beverage pod in sequence after the first. It is also contemplated that more than two beverage pods can be used to create larger quantities of juice, or juices with different ratios of water and juice. In embodiments using multiple beverage pods in sequence, the amount of water injected into the beverage compartment can be adjusted according to the number of beverage pods that are compressed (e.g., an amount of water that preserves the ratio of water to beverage pod contents as in a single beverage serving). Alternatively, the amount of water injected into the beverage reservoir can be adjusted to create more highly concentrated juice flavors or less concentrated juice flavors (e.g., 50-100% of the normal water ratio or 100-150% of the normal water ratio).

Figure 10:
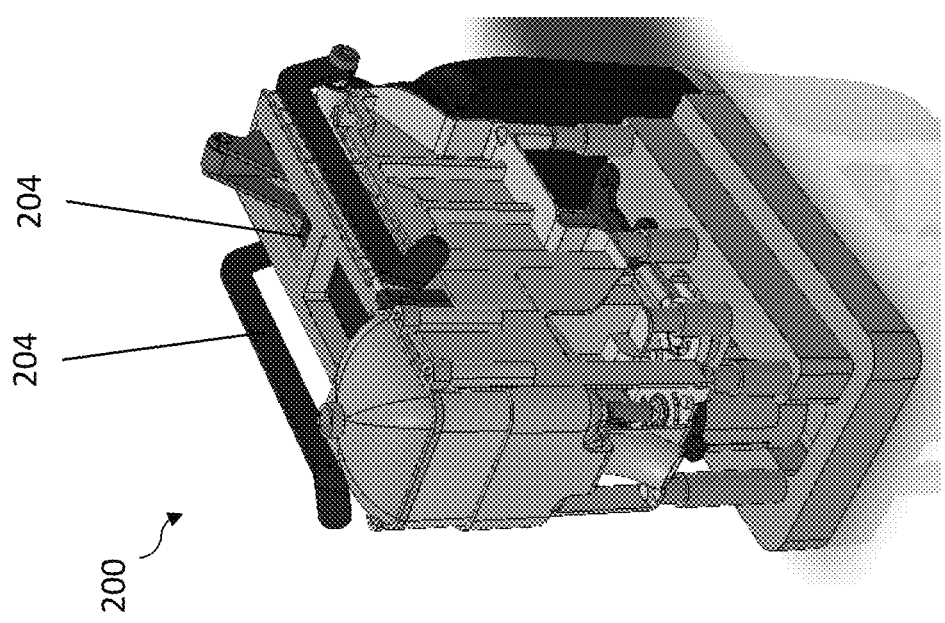
FIG. 10 is an embodiment of the juice making system having a manually actuated compression mechanism.

In some embodiments, once a beverage pod has been compressed by the compression mechanism 102 to squeeze its contents into the beverage reservoir 104, the mechanism can then retract (e.g., automatically by a linear actuator as seen in FIGS. 1-9, or manually as seen in FIG. 10). After the compression mechanism 102 is retracted, the system 100 can cause a pod disposing mechanism (e.g., a solenoid or another electromechanical actuator such as a motor, a linear actuator, etc.) to activate that pushes the compressed pod out of the beverage pod compartment 138 and into a compressed pod compartment 134. Additionally, or alternatively, the slot 136 in the bottom of the beverage pod compartment 138 can be coupled with a pod dispensing mechanism that causes the slot to open wider (e.g., to swing open like doors or to slide open wider). Additionally, or alternatively, a compressed pod can be dispensed into the compressed pod compartment 134 purely by gravity upon retraction of the compression mechanism 102.

As seen in FIG. 9, a slot 136 can be included in the bottom of the beverage pod compartment 138 that allows a compressed beverage pod to fall into the compressed pod compartment 134. The slot 136 can be sized and dimensioned such that an uncompressed pod could not fit through the slot 136.

FIG. 2 shows the beverage making system 100 of FIG. 1 without an outer covering 106. Many of the key components of the beverage making system 100 are visible. Embodiments of the beverage making system 100 include at least two fluid chambers: a water reservoir 108 and a beverage reservoir 104. The water reservoir 108 can hold more volume than the beverage reservoir 104. In some embodiments, the water reservoir holds the same volume, while in other embodiments, the beverage reservoir 104 holds more volume than the water reservoir.

The water reservoir 108 includes several important features. It has at least an inlet 110 and an outlet 112. The inlet 110 can be an open top, as shown in the embodiment in FIG. 1. In other embodiments, the water reservoir inlet 110 can be configured to allow water to come in via a continuous water source (e.g., a connection to a water line like a sink). The water reservoir 108 can be sized and dimensioned to contain a range of different volumes (e.g., 0.5-1 L, 1-1.5 L, 1.5-2 L, 2.5-3 L, 3.5-4 L, 4-4.5 L, etc.).

In some embodiments, the inlet is not an open top as seen in FIG. 1. Water can be added to the water reservoir 108 via a small inlet that is not open to ambient air. This configuration has advantages in that it minimizes the amount of dust or other particulate matter that can be introduced into the system via the water reservoir 108. A disadvantage is that is can be more difficult using an open water source (e.g., a sink) since a water source would need to be coupled with the inlet instead of simply held above it to fill the water reservoir 108.

Figure 3:
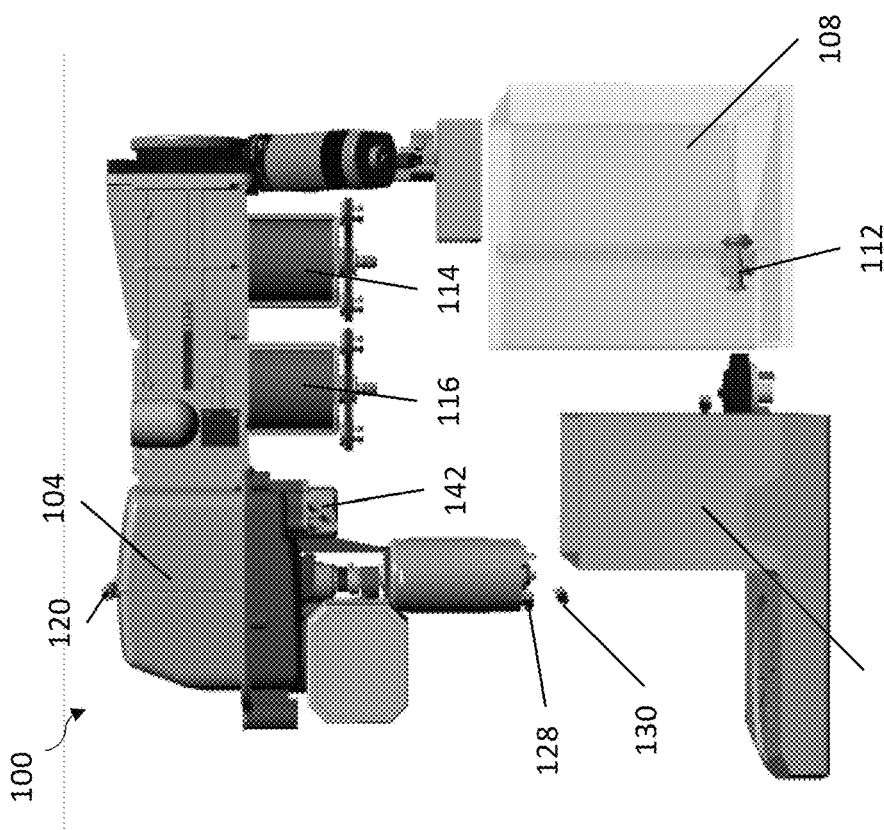
FIG. 3 is a side view of the beverage making system of FIG. 1 showing internal components.
Figure 7:
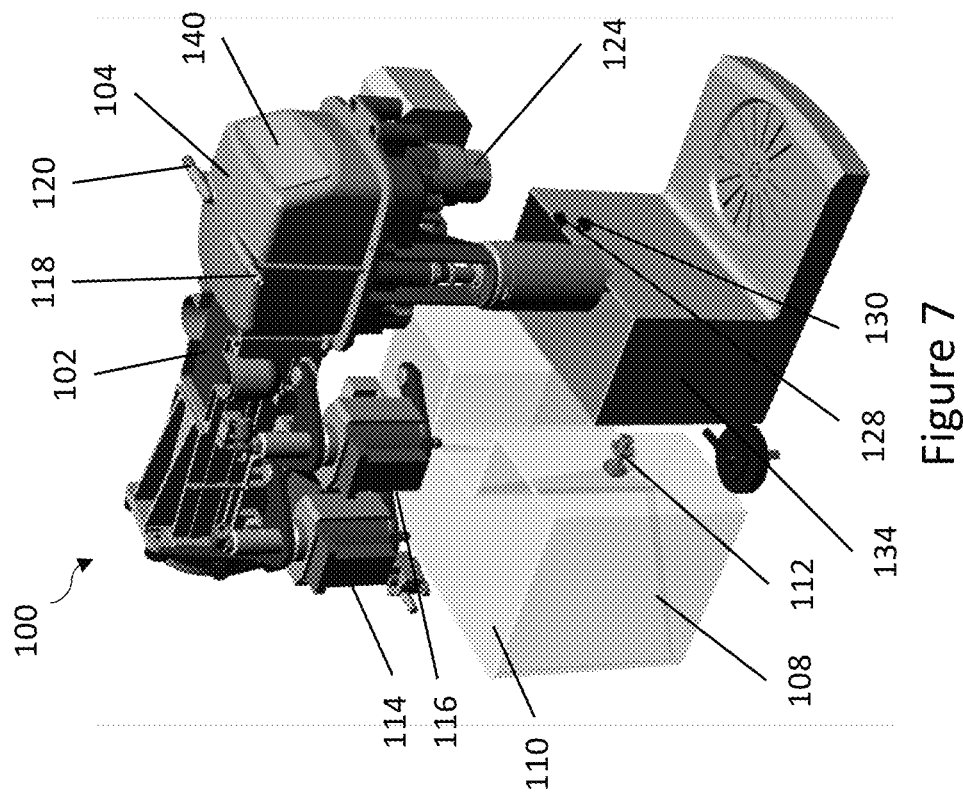
FIG. 7 is rear, perspective view of the beverage making system as shown in FIG. 3.

The water reservoir 108 also has an outlet 112. The water reservoir outlet 112 leads to two pumps 114 & 116 (as best seen in FIGS. 3, 4, and 7) that motivates the transfer of water from the water reservoir 108 to the beverage reservoir 104. In embodiments with more than one pump, one of the pumps can be used for transfer of water to the beverage reservoir 104 to create a beverage, and the other pump can be used to transfer water for cleaning the beverage reservoir 104. In some embodiments, the pumps 114 & 116 act in tandem: both pumps transferring water to the beverage reservoir 104 to create beverage, and both pumps transferring water to the beverage reservoir 104 to self-clean (e.g., rinse the interior of the beverage compartment) after the beverage has been blended).

The water reservoir outlet 112 is located near the bottom of the water reservoir 108 to increase the amount of fluid that can be drawn out of the water reservoir 108. Although the entire water reservoir outlet 112 is shown to be located near the bottom of the water reservoir 108 in the embodiment shown in FIGS. 2-4 and 7, only a portion of the water reservoir outlet 112 needs to be located near the bottom of the water reservoir 108 so that water can be drawn out of the water reservoir 108 until it is empty or mostly empty.

The water reservoir outlet 112 can be configured to restrict flow to a maximum flow rate based on several factors including the pump or pumps (i.e., the volumetric flow rate capabilities of the pump(s) or the volumetric flow rate of the various nozzles, inlets, and outlets in the system) implemented in the system. Additionally, the water reservoir outlet 112 can include a filter that helps to prevent particulate matter from entering or passing through the pumps 114 & 116 or any of the other parts of the fluid flow system within the beverage making system 100. Alternatively, or additionally, the water reservoir outlet 112 on the water reservoir 108 can be located some height above the bottom of the water reservoir 108 (e.g., by 0-0.5 cm, 0.5-1 cm, or 1-1.5 cm). This can help prevent particulate matter that has settled on the bottom of the reservoir from damaging other portions of the system 100.

Beverage reservoirs of the inventive subject matter can include one or two inlets to receive water from the pump(s). The embodiment shown in FIGS. 1-9 includes two inlets 118 & 120 on the top portion of the beverage reservoir 104, which are configured to accommodate fluid lines that to couple to the outputs 122 & 124 of the pumps 114 & 116. In some embodiments, the inlets 118 & 120 can be located on the bottom portion of the beverage reservoir 104. In some embodiments, nozzles can be disposed within the beverage reservoir 104 where the inlets 118 & 120 enter the interior of the beverage reservoir 104.

Nozzles can introduce water to the beverage reservoir 104 at higher speeds, and they can spread the spray of water out so that all or almost of the entire interior of the beverage reservoir 104 can be rinsed. This touches on two aspects of the beverage machine: beverage making and self-cleaning.

A nozzle can introduce water into the beverage reservoir 104 in a focused stream, in a wide spray, or even in an atomized spray. In embodiments with the focused stream, the focused stream can be aimed such that it sprays directly into (or onto) the frozen (or semi-frozen) contents of the beverage pod that has been introduced to the beverage reservoir 104. This can help break apart the contents of a beverage pod. Alternatively, or additionally, a nozzle can spray water into the beverage reservoir 104 to contact its interior surfaces. This type of spray can be useful for a self-cleaning process as it would rinse the interior walls of the beverage container 114. Atomized spraying can be used in a similar manner as a wide spray—to clean the interior walls of the beverage reservoir and to introduce water into the beverage reservoir 104 to create a beverage in conjunction with the contents of the beverage pod 114.

Self-cleaning can be accomplished in several ways, either alone or in combination with each other. For example, a rinse can occur after each beverage is created by the system 100. The rinse is effectuated by introduction of water into the beverage reservoir via inlets 118 & 120. In another example, a deep-cleansing occurs after some number of cycles of beverage creation (e.g., 2-4, 4-6, 6-8, 8-10, 10-12, 12-14, 14-16, 16-18, and 18-20 cycles) or after some duration of time (e.g., 12-24 hours, 24-36 hours, 36-48 hours, 48-60 hours, 60-72 hours, 72-84 hours, 84-96 hours, 96-108 hours).

In another example, the system undertakes a mineral buildup removal process, or signals that a mineral buildup removal process is required, based on a detected change in the flow rate of water through the system (e.g., at any portion of the system where water flows through closed ducting or nozzles). Flow rates can be detected using flow meters or other sensors. Upon detecting a decrease in flow rate sufficient to signal the need for a mineral buildup removal process (e.g., 95-90%, 90-85%, 85-80%, 80-75%, 75-70%, 70-65%, 65-60%, 60-55%, 55-50% of normal flow for a system, where normal flow is defined as an average flow rate for a system when new or immediately following a mineral buildup removal process).

Mineral buildup removal can be accomplished by running certain chemicals or cleaning fluids through the system. For example, it is widely known that, for example, vinegar can eliminate mineral buildup on faucets. Thus, when the need for a mineral buildup removal process is signaled, the water reservoir can be filled with vinegar or a diluted vinegar solution (or in other instances, various cleaning solutions), to be run through the system to eliminate mineral buildup in the fluid flow components of the system. The mineral buildup removal process can also occur at elevated temperatures.

In any of the self-cleaning processes, the fluid introduced via inlets 118 & 120 for the purpose of cleaning can either be room temperature or heated to a desired temperature for cleaning (e.g., 100-110, 110-120, 120-130, 130-140, 140-150, 150-160, 160-170, 170-180, 180-190, 190-200, 200-210, 210-220 F).

The beverage reservoir 104 additionally includes a blending element 126 (e.g., a rotating blade as seen in FIG. 6). The blending element 126 encourages even mixing of the contents of a beverage pod by breaking apart frozen pieces and causing the contents of the beverage pod to melt more quickly within the beverage compartment 104 to create a serving of a beverage for dispensation. The blending element 126 can also be used to improve a self-cleaning process by causing water within the beverage reservoir to hit the interior walls of the beverage reservoir to rinse them off. Blending elements that include rotating blades that can have 1, 2, 3, 4, or more blades, and the blades on the blending element can be coplanar or exist within different planes along the rotating central axis of the blending element.

In different embodiments, water (or both water and the contents of the beverage pod) introduced into the beverage reservoir 104 can be heated to a desired temperature at various points within the system 100. To accomplish this end, a heating element can be incorporated into the system 100.

A heating element 142 can be incorporated in several different ways. In some embodiments, the heating element can be incorporated to heat the entire contents of the water reservoir 108. An advantage of the configuration is the ease of reaching a desired temperature and holding at that temperature. Water temperature in the reservoir can be monitored using a thermometer (e.g., an electronic thermometer), and a small controller can be implemented to control the heating element. This implementation can facilitate bringing the water in the water reservoir 108 to a desired temperature and then sustaining the desired temperature.

In some embodiments, a heating element can be incorporated into a fluid line that couples the water reservoir 108 to beverage reservoir 104. An advantage of this configuration is a lowered energy requirement since the entire contents of the water reservoir 108 would not need to be heated at once and prior to use, instead heating only on an "as needed" basis. Additionally, different water temperatures could be achieved on a per-cup basis. For example, a first cup of beverage could be made at a temperature of 55 F, while a second cup could be made at 65 F.

In some embodiments, a heating element 142 can be incorporated into the beverage reservoir 104 itself. In these embodiments, the element 142 can be used to heat up the contents of the beverage pod when it is in the beverage reservoir 104, it can be used to heat the contents of the beverage pod and water when both are in the beverage reservoir 104, or it can be used to heat just water in the beverage reservoir 104 before the contents of the beverage pod is introduced.

In still further embodiments, the system can include a small refrigerating device to bring water in the water reservoir 108 down to a desired temperature (e.g., 33-40 F, 40-45 F, 45-50 F, 50-55 F, 55-60 F, and 60-65 F). With the water starting at a lower starting temperature, the system can make beverages at a variety of different temperatures above that starting point since it is generally easier to quickly raise the temperature of water than to quickly lower it. Heating components can be incorporated into these embodiments in all the above-mentioned locations in any combination.

Figure 5:
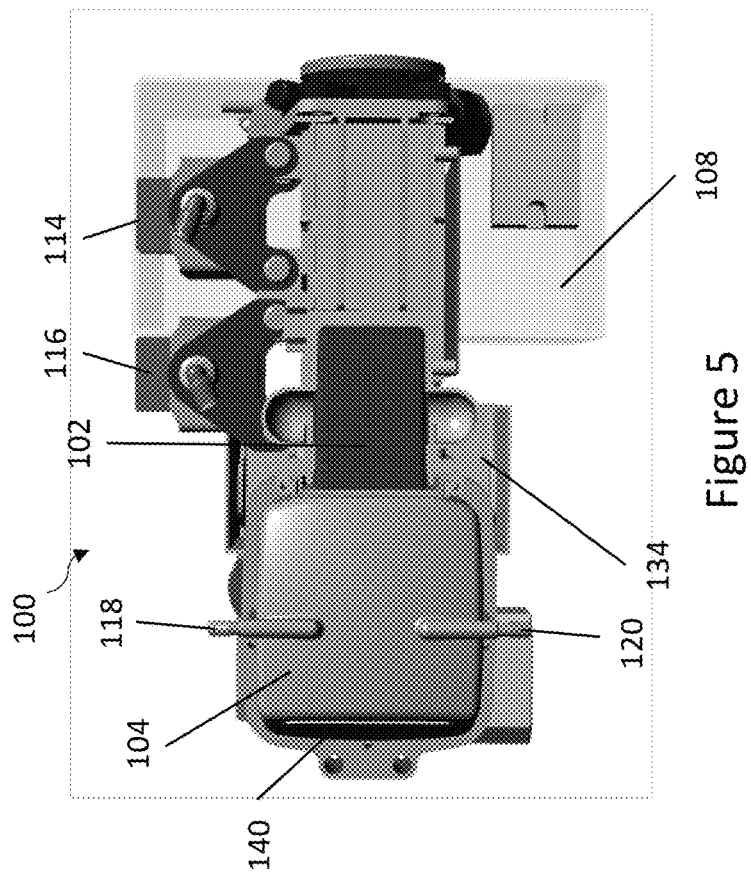
FIG. 5 is a top view of the beverage making system as seen in FIG. 3.
Figure 8:
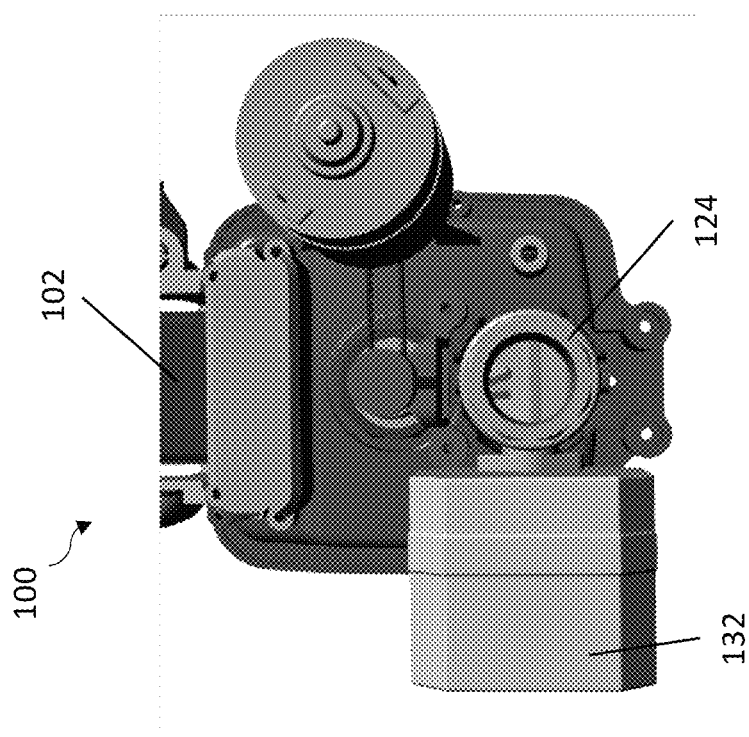
FIG. 8 shows a bottom view of the beverage reservoir outlet.

Before a beverage can be made, the contents of a beverage pod must be introduced into the system 100. As seen best in FIG. 9, a beverage pod compartment 138 is accessible through the top of the system 100. FIG. 5 shows the opening of the compartment with the compression mechanism 102 full extended into the compartment area, while FIG. 9 shows the beverage pod compartment 138 with the compression mechanism retracted. When the compression mechanism 102 is retracted, a beverage pod compartment 138 is configured to accommodate the insertion of a beverage pod. With a beverage pod inserted, the compression mechanism 102 presses into the beverage pod compartment 138 sufficient to cause the contents of the beverage pod to be pressed out of the beverage pod and into the beverage reservoir 104.

The compression mechanism 102 as shown in the figures is a piston-style mechanism (e.g., a component that moves linearly to compress a beverage pod within the beverage pod compartment 138). It can be actuated, as in FIGS. 1-9, by a linear actuator (e.g., a motor driven screw). In other embodiments of the system, like the system 200 shown in FIG. 10, the mechanism 202 is actuated by a simple machine 204 (e.g., a lever combined with one or more linkages). The lever 204 in these embodiments can be pivoted about its connection point to cause a linkage to convert rotational movement into translational movement.

The beverage pod compartment 138 in any embodiment of the system 100 can include additional technologies to improve on the system overall. In some embodiments, the beverage pod compartment 138 includes electronics 140 sufficient to read information stored on an inserted beverage pod. For example, the beverage pod compartment 138 (or other nearby component) can include an RFID reader, a Bluetooth chip, a barcode scanner (including 1D and 2D barcodes such as QR codes), etc. Upon inserting a beverage pod having a bar code, an RFID tag, a Bluetooth chip, or some other form of information storage system that can be detected or read by electronics of the system.

This feature can be used to identify what type of beverage is being made and to customize the beverage-making process to improve the overall quality of the beverage. For example, in some embodiments, the beverage making system 100 could detect that an inserted beverage pod recommends the beverage to be made at 55 degrees F. (or, in other examples, 33-40 F, 40-45 F, 45-50 F, 50-55 F, 55-60 F, and 60-65 F). In another example, the beverage making system 100 can identify how long the contents of a particular beverage pod should be mixed (using the blending element) with the water in the beverage reservoir 104 to produce the beverage. The system 100 can modulate its various subsystems (heater(s), refrigerator(s), pump(s), rotating blade(s), etc.) to create a beverage having desired attributes (temperature, viscosity, etc.).

Alternatively, or additionally, the beverage making system 100 can include one or more sensors to detect whether a cup is in position to receive a completed beverage from the beverage reservoir outlet 124. The sensor can be an optical sensor (e.g., visible light, infrared light, ultraviolet light, or some other electromagnetic wave frequency), it can be a weight sensor, or it can be a combination of the two. In embodiments with one or more sensors to detect the presence of a cup (or other beverage container), the system can refrain from releasing a beverage until a container is detected as being in place to receive the beverage.

Embodiments having both a weight sensor and an optical sensor can avoid false beverage receptacle detections by requiring both detection of a weight and optical detection of a beverage receptacle. For example, if a user's hand happens to accidentally trigger an optical sensor, the system would not dispense the beverage inside the beverage reservoir 104 until the weight sensor simultaneously detects presence of a beverage receptacle. Once simultaneous detection occurs, dispensation of a beverage from the beverage reservoir outlet 124 can occur (e.g., automatically, after an amount of time (1-2, 2-3, 3-4, or 4-5 seconds), or upon user input (e.g., pressing a button)).

Optical sensors of the inventive subject matter can be incorporated into different locations on the system, so long as the sensors can "see" the beverage receptacle area. For example, in the embodiment shown in FIGS. 1-9, two optical sensors 128 & 130 are positioned within the splash barrier of the beverage receptacle platform. The beverage reservoir outlet 124 can be actuated by an electromechanical actuator 132 (e.g., a stepper motor, a servo motor, a solenoid, or any other appropriate actuator).

Specific compositions and methods of a beverage making system have been disclosed in this application. It should be apparent to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular, the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A beverage making system that uses a beverage pod to create a beverage, comprising:

a water reservoir coupled to a beverage reservoir, wherein the beverage reservoir is at least partially surrounded by an outer covering that is separate from the beverage reservoir, the beverage reservoir comprises an inlet to receive unheated water from the water reservoir, and the beverage reservoir is configured to store the beverage therein while the beverage is prepared;

the inlet comprising a nozzle disposed within the beverage reservoir and configured to spray water directly into the beverage reservoir;

an outlet coupled with the beverage reservoir and comprising an electromechanical actuator to actuate the outlet to dispense the beverage in the beverage reservoir, the electromechanical actuator configured to allow the beverage reservoir to store the beverage prior to actuation;

a pod receiving compartment coupled directly to the beverage reservoir, the pod receiving compartment being coupled with a piston mechanism;

a heater incorporated into the beverage reservoir and configured to add heat to the beverage reservoir;

wherein the beverage pod is placed into the pod receiving compartment and the piston mechanism is configured to compress the beverage pod within the pod receiving compartment to empty the beverage pod's contents into the beverage reservoir;

a compressed pod compartment positioned below the pod receiving compartment and configured to receive the beverage pod after the piston mechanism has compressed the beverage pod and has subsequently retracted;

wherein the piston mechanism is further configured to extend into the pod receiving compartment such that at least one surface of the piston mechanism reaches the beverage reservoir; and a rotatable blade disposed within the beverage reservoir, wherein the rotatable blade is activated to mix water from the water reservoir with the contents of the beverage pod to create the beverage.

2. The beverage making system of claim 1, further comprising an electronic beverage pod-reader.

3. The beverage making system of claim 2, wherein the electronic beverage pod-reader comprises an RFID reader that is configured to collect information regarding the beverage pod in the pod receiving compartment.

4. The beverage making system of claim 1, wherein the beverage pod's contents is frozen.

5. The beverage making system of claim 1, wherein the piston mechanism is electronically actuated.

6. The beverage making system of claim 1, wherein the piston mechanism is manually actuated using a lever coupled with the piston mechanism.

* * * * *